US006857832B2

United States Patent
Nygård

(10) Patent No.: US 6,857,832 B2
(45) Date of Patent: Feb. 22, 2005

(54) DRILL BIT WITH PILOT POINT

(75) Inventor: Eero Nygård, Skövde (SE)

(73) Assignee: Sandvik AB, Sandviken (SE)

( * ) Notice: Subject to any disclaimer, the term of this patent is extended or adjusted under 35 U.S.C. 154(b) by 59 days.

(21) Appl. No.: 10/303,799

(22) Filed: Nov. 26, 2002

(65) Prior Publication Data
US 2003/0143043 A1 Jul. 31, 2003

Related U.S. Application Data

(63) Continuation-in-part of application No. PCT/SE01/01166, filed on May 23, 2001.

(30) Foreign Application Priority Data

May 26, 2000 (SE) .............................................. 0001969

(51) Int. Cl.[7] .............................................. B23B 51/02
(52) U.S. Cl. ...................... 408/211; 408/225; 408/230
(58) Field of Search ................................ 408/211, 223, 408/224, 225, 227, 229, 230

(56) References Cited

U.S. PATENT DOCUMENTS

| | | | | |
|---|---|---|---|---|
| 2,332,295 A | * | 10/1943 | Bouchal | 408/211 |
| 2,652,083 A | * | 9/1953 | Emmons | 408/211 |
| 2,936,658 A | * | 5/1960 | Riley | 408/230 |
| 4,529,341 A | * | 7/1985 | Greene | 408/212 |
| 4,565,473 A | * | 1/1986 | Hosoi | 408/229 |
| 4,878,788 A | | 11/1989 | Wakihira et al. | |
| 5,288,183 A | * | 2/1994 | Chaconas et al. | 408/211 |
| 6,050,754 A | | 4/2000 | Thomas | |
| 6,113,321 A | | 9/2000 | Mulroy et al. | |

FOREIGN PATENT DOCUMENTS

| | | | |
|---|---|---|---|
| DE | 911 799 | 5/1954 | |
| DE | 31 23 048 | 8/1982 | |
| EP | 0 137 898 | 4/1985 | |
| FR | 1111617 | * 3/1956 | 408/211 |
| GB | 2 193 913 | 2/1988 | |
| JP | 237709 | * 9/1990 | 408/211 |
| JP | 117507 | * 5/1991 | 408/211 |

OTHER PUBLICATIONS

English Abstract of German 3123048.*

* cited by examiner

Primary Examiner—Daniel W. Howell
(74) Attorney, Agent, or Firm—Burns, Doane, Swecker & Mathis, L.L.P.

(57) ABSTRACT

A drill bit for the working of metal has a center pilot tip that transforms into straight cutting edges extending towards the outer periphery of the bit. Each cutting edge forms a cutting angle of 1–20° with a reference plane oriented perpendicular to of the drill axis. Each a cutting edge is inclined in a radially inward and axially rearward direction toward the drill axis. The center tip forms a pilot point angle of 90±2° and a has base that takes up 23–45 percent of the total diameter of the cutting section of the drill bit. The tip has a tip angle of 90±10°.

9 Claims, 2 Drawing Sheets

DRILL BIT WITH PILOT POINT

This application is a continuation-in-part of International Application Serial No. PCT/SE01/01166, filed May 23, 2001, the entire content of which is hereby incorporated by reference.

BACKGROUND OF THE INVENTION

The present invention relates to a drill for working metal.

TECHNICAL BACKGROUND

When drilling in metal, the drill bit is subjected to great strain. The drill often gets heavily worn, which quickly affects the accuracy in the making of holes. One way of trying to solve the problem has been to use hard materials for manufacturing the drill bits. This type of drill is often strong but brittle at the same time and often causes the drill to be coated with chips from the tougher material in which the drill operates. This coating with chips means that the difference between the desired and the achieved accuracy in bore diameter often deviates significantly.

Moreover, great demands are placed on the service life of the drill and the quality of the result when using the drill, in particular as regards industrial use. EP 0 761 352 (corresponding to U.S. Pat. No. 6,113,321) discloses a drill which is designed with a certain reduction of the consumption of material and involves easier working of metal. This document concerns drills of roll-forged steel which is not really usable for industrial or other professional use, but is developed to meet the need from the lower part of the market. However, EP 0 761 352 indicates that a certain design of the cutting edges of the drill, from the center pilot tip towards the external edge of the drill, in which direction the cutting edges of the drill are given an inclination forwards, produces a better drill hole.

Also DE-31 23 048 discloses a drill with drill bits which are inclined rearwardly towards the center axis of the drill. Due to this design of the drill bits, the chips find their way towards the center instead of towards the periphery of the hole and a better accuracy as regards the diameter of the hole is achieved. Yet another patent specification DE-911 799 discloses a drill that uses the principle described above to remove the chips in a better way during the actual drilling and, thus, reduce the risk of the drill being coated with chips. The documentation of the two latter drills clearly shows that they are intended for materials such as wood, plastic, concrete and plaster.

For metal and especially industrial working of various metals, completely different material properties of the drills are required since, on the one hand, they must often satisfy stricter standards of quality and demands and, on the other, they are subjected to heavier wear and greater forces than other types of drills. When drilling in metal, also the drilling spindle and its bearings are subjected to great strain as a result of great radial forces, which makes it necessary for the drilling spindle to be serviced or even changed on frequent occasions.

The problem of achieving high quality of the worked material without simultaneously obtaining excessive radial forces, which shortens the service life of both drills and spindles, thus remains to be solved when drilling metal.

SUMMARY OF THE INVENTION

An object of the present invention is thus to provide a drill that offers an improved solution, in relation to prior-art technique, to the problem with drill chips and their negative effect on the making of holes, without simultaneously obtaining excessive radial forces when drilling in metal. According to the invention, this object is achieved by a drill bit comprising a body having a center pilot tip at a front end thereof. The center tip transforms into two cutting edges at a base of the tip. The cutting edges extend toward an outer periphery of the body. the body defines a center axis of rotation passing through the cutting tip. Each cutting edge forms a cutting angle relative to a reference plane extending perpendicularly to the axis. The cutting angle is in the range of 1–20°. The cutting tip includes two tip edges converging forwardly from the base and forming a tip angle of 90±10°. The base, as viewed in a direction along the axis, has a dimension in the range of 23–45% of a maximum diameter of the front end of the drill. The tip forms a pilot point angle relative to the reference plane in the range of 90±2°.

Thus, the invention relates to a drill bit for working of metal, which drill bit has a center tip that passes into cutting edges extending towards the periphery, and a center line (A), and which drill bit has a cutting angle ($\alpha$) of 1–20° between the normal direction of the drill axis and a cutting edge which thus is inclined radially inwardly and axially rearwardly towards the center line (A), and the center pilot tip forming a point angle ($\eta$) of 90±2° and a base that takes up 23–45%, or preferably 30–40%, and preferably about one third of the cutting portion of the total diameter of the drill bit.

The above-described relationship between the extension of the base of the drill bit and the diameter of the drill bit as well as the inclination of the cutting edges axially rearwardly towards the center of the drill means that the radial forces are decreased at the same time as coating of the drill with chips is avoided. With a pilot point angle of 90°, a sharp point that comprises the center tip and a chip face, is obtained. The pilot point angle is defined as the angle between a line in the normal direction of the drill axis and the side of the center tip, and is here designated ($\eta$). Since the drill bit is preferably made double-cutting, there will be enough space to remove the chips.

In a preferred embodiment of the invention, the drill bit has a tip angle ($\beta$) of 90±10°. The tip angle is here defined as the angle between two lines that each constitute an imaginary extension of a respective one of the center tip flanks 2$a$ and this tip angle is here designated ($\beta$). In this range of angles for the tip angle, the drill has optimal performance for metal working. Metals that the drill bit is preferably intended to work are brass, copper and light metals, such as aluminum.

According to a preferred embodiment of the invention, the drill bit has a cutting angle ($\alpha$) of 10±3° formed between a plane normal to the drill axis and a cutting edge which thus is inclined axially rearwardly and radially inward, towards the center line (A) and maintains this angle all the way to the periphery of the drill bit. The cutting angle is here designated ($\alpha$).

This design of the cutting edges, and the above-defined shape form and extension of the tip angle, means that the center pilot tip hits the workpiece first. Thus, vibrations and movements of the drill are stabilized before the cutting edges start working the material. The distance between center pilot tip and edge ends should thus not be too long, especially if the drill bit is to be used for thinner metal sheets. The center pilot tip then presses down and deforms the metal sheet before the cutting edges engage with the metal sheet and can even cause the metal sheet to be split open. The angle of the cutting edges is not allowed to be too steep, because this would shorten the service life of the cutting edges.

In a preferred embodiment of the invention, the drill bit has a cutting edge with a primary angle of clearance of 10±3° in relation to a plane normal to the drill axis. This primary angle of clearance is here designated ($\phi$). If the primary angle of clearance is greater than the upper limit indicated above, the generation of heat becomes very high during the working. A smaller angle than the indicated lower limit is unsuitable as regards working of precisely the metals mentioned above. Most preferably, the primary angle of clearance should be 10–12°.

According to another preferred embodiment of the drill bit, the cutting edge can also have a secondary angle of clearance of 25±5° in relation to a plane normal to the drill axis. This secondary angle of clearance is here designated ($\theta$). Owing to such a two-part clearance described above (i.e., primary and secondary clearances), the drill obtains a more continuous transition from the cutting edges down towards the helical guiding edges. This design provides space for removing chips and other residual products. By enabling a quick and efficient removal of the chips, the risk of local imperfections and high frictional heat is reduced.

Both the angles of clearance mentioned above have a decreasing inclination in a direction opposite to the direction of rotation of the drill. The clearance can be provided by, for example, cutting in facets or finding the envelope surface of the cone.

In a preferred embodiment, the drill bit, comprises hard metal. The drill bit comprises diamond in another preferred embodiment. Also other materials with material properties that are good enough may be used for making drill bits of the above-mentioned design. A drill bit which has one or more of the above-mentioned features is preferably included in a twist drill. The helix angle is preferably 0–30°, but the invention is not limited to a specific helix angle. Within the scope of the invention as regards a drill or a drill bit of the type indicated above, the features described above can, of course, be combined freely or be present as separate embodiments.

Today there are a plurality of types of drills which have means for internal cooling. The drill described above is in this respect no exception, but can without difficulties be provided with means for internal cooling. There are, for instance, solutions where a coolant is passed into a duct that is internally located in the drill. This solution can also be used for said drill if such demands are made on the production.

BRIEF DESCRIPTION OF THE DRAWING

In the following, the invention will be described in more detail by way of an example and with reference to the accompanying drawing.

DESCRIPTION OF A PREFERRED EMBODIMENT

Figure 1:
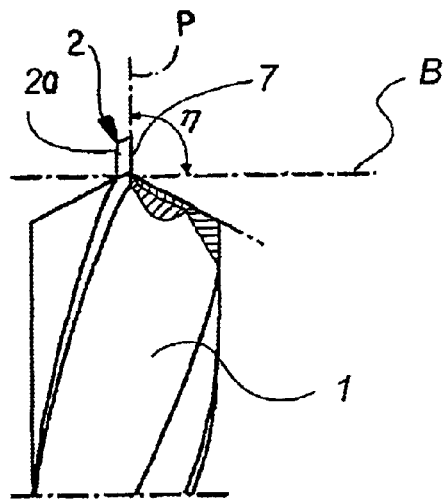
FIG. 1 is a side view of the drill bit.

FIG. 1 is a side view of a drill bit 1 according to a preferred embodiment of the invention. The drill bit 1 is mainly intended for the working of brass, copper and light metals, such as aluminum. Also alloys with light metal are regarded as light metals. The drill bit is advantageously included in a drill made of a piece of hard metal or similar material. The drill is suitably ground in order to achieve its proper form.

In FIG. 1, the center tip 2 is shown from the side having a pilot point angle ($\eta$) of essentially 90±2°. The angle ($\eta$) is defined as the angle between a reference plane B normal to the axis A of the drill and reference a plane P which contains both a side 7 of the pilot center tip 2 and a respective chip face 6 of the drill (see also FIG. 4).

Figure 4:
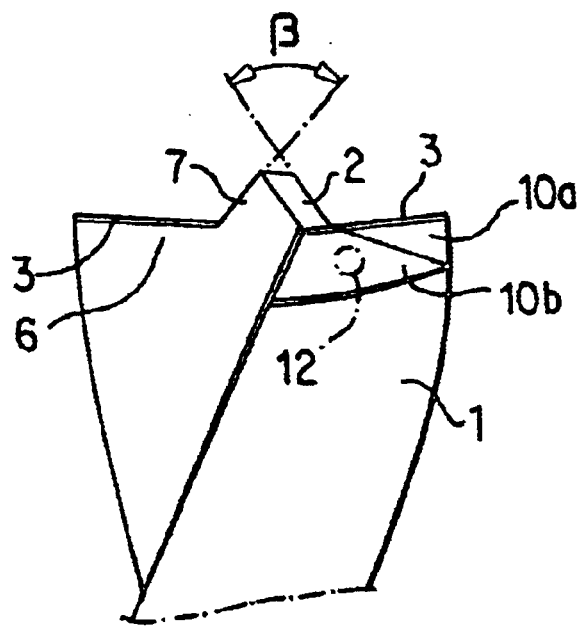
FIG. 4 is a front perspective view of a front end of the drill.
Figure 5:
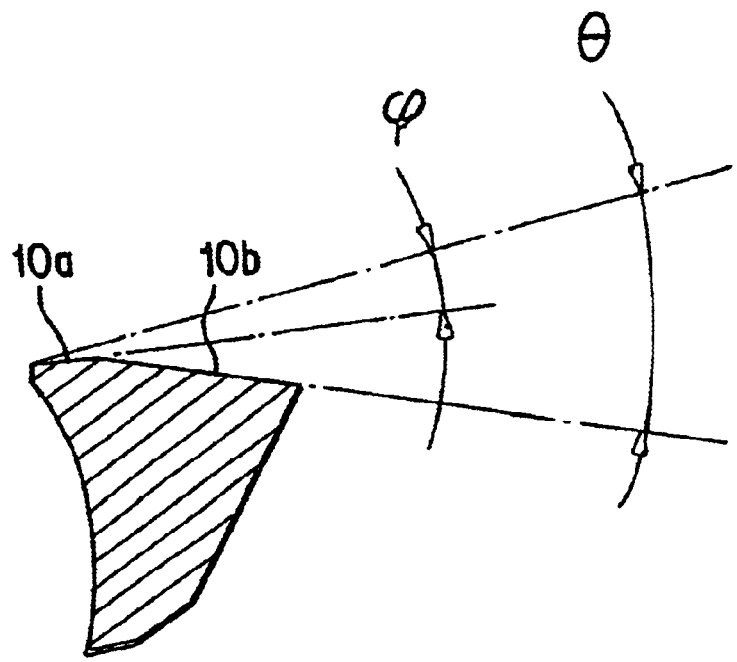
FIG. 5 is a sectional view taken along the line V—V in FIG. 3.

From FIGS. 4 and 5 is can be seen that the drill includes a clearance surface structure located behind each of two straight cutting edges 3 of the drill (with reference to the direction of the rotation). In the depicted embodiment, that structure comprises two clearance surfaces 10a, 10b which form primary and secondary clearance angles $\phi$ and $\theta$ respectively, with respect to the plane B.

The primary angle of clearance $\phi$ extends in a sloping manner downwards in a direction opposite to the direction of rotation of the drill at an angle of preferably 10–12°. The secondary angle of clearance $\phi$ which here directly follows the primary one has a greater angle of clearance and is 25±5°, preferably about 25°. These angles are given only as examples of the preferred embodiment and should not be considered to restrict the invention. In order to obtain the angle of clearance described above, either the envelope surface of the cone of the drill bit can be ground or the drill bit can be cut in facets.

It is not necessary that there be two clearance surfaces 10a, 10b. Instead, only the primary clearance surface 10a could be provided, and it would define a clearance angle of 10–12°.

The drill could have a through-hole for cooling fluid, which branches into passages 12 that port at the cooling structure (see FIG. 4).

Figure 2:
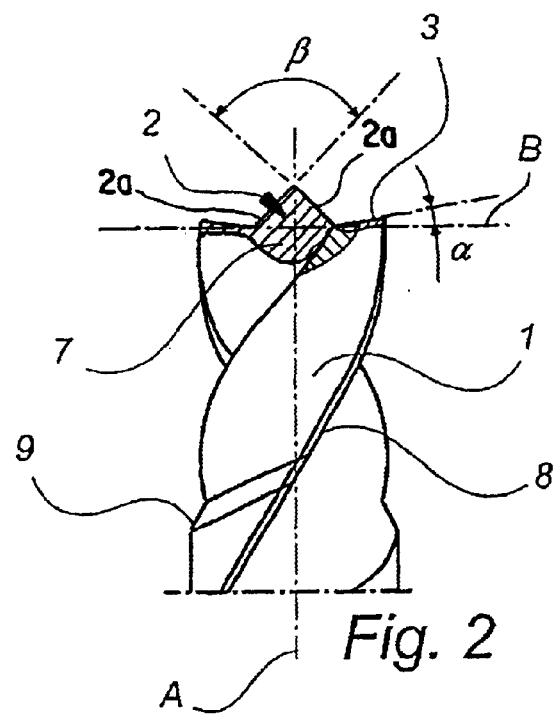
FIG. 2 is a side view of the drill bit rotated through 90°.

FIG. 2 shows the drill bit 1 from the side rotated through 90° about its axis (A) with respect to FIG. 1. The point of the center tip 2 forms a tip angle ($\beta$) of 90±10°. Each of the cutting edges 3 exhibits an extension which is inclined towards the center line A in a direction having a radially inward component and an axially rearward component (i.e., the outer end of each cutting edge 3 is located farther forwardly than is an inner end thereof). This angle of the cutting edges is designated a cutting angle ($\alpha$) and is in the range of 1–20°, preferably 10±3°. The chip face 6 is essentially planar along the cutting edge 3. The essentially planar chip face has an extension in the direction of propulsion of the drill of about 1 mm all the way out to the periphery of the drill, but, of course, the length of the extension also depends on the dimension of the drill.

In this embodiment, the drill bit constitutes a part of a twist drill. The helix angle of the guiding edges 8 is greater than zero but no more than 30°, preferably 25–30°, relative to the direction of extension of the drill axis.

Figure 3:
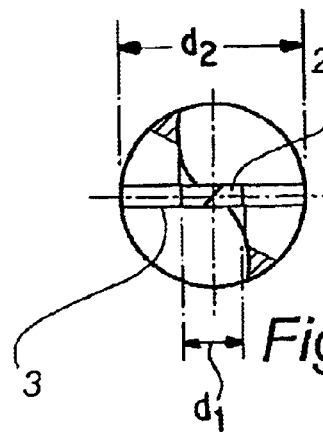
FIG. 3 is a front view of the drill bit.

FIG. 3 shows the front side of the drill bit, the relationship between the length of $d_1$ of the base of the center tip 2 and the total diameter $d_2$ of the drill bit being evident. In a preferred embodiment, this ratio of the length $d_1$ of the base of the center tip to the total diameter $d_2$ of the drill bit is in the range of 23–45 percent, preferably 30–40 percent, and most preferably 33 percent.

In a preferred embodiment, the drill bit is made of hard metal. The drill bit comprises diamond in yet another preferred embodiment. Also other materials with material properties that are good enough may be used for making drill bits of the above-mentioned design. A drill bit which has one or more of the above-mentioned features is preferably included in a twist drill. The helix angle is preferably 0–30°, but the invention is not limited to a specific helix angle. Within the scope of the invention as regards a drill or a drill bit of the type indicated above, the features described above can, of course, be combined freely or be present as separate embodiments.

The above-described drill structure ensures that the center pilot tip hits the workpiece first. Thus, vibrations and movements of the drill are stabilized before the cutting edges start working the material. The distance between center pilot tip and the outer end of each cutting edge 3 should thus not be too long, especially if the drill bit is to be used for thinner metal sheets, to prevent the center pilot tip from pressing down and deforming the metal sheet before the cutting edges engage with the metal sheet, or even splitting open the metal sheet to be split open. The angle of the cutting edges is not allowed to be too steep, because this would shorten the service life of the cutting edges.

It has been found that a drill according to the invention virtually eliminates the creation of burrs at the exit end of a drilled hole.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A drill bit for working metal, comprising a body having a center pilot tip at a front end thereof; the center tip transforming into two straight cutting edges at a base of the tip, each cutting edge extending toward an outer periphery of the body; the body defining a center axis of rotation passing through the cutting tip; each cutting edge forming a cutting angle relative to a reference plane extending perpendicularly to the axis, the cutting angles being equal and in the range of 1–20 degrees; the cutting tip including two tip edges converging forwardly from the base and forming a tip angle of 90±10°; the base, as viewed in a direction along the axis, having a length in the range of 23–45 percent of a maximum diameter of the front end of the drill; the tip forming a pilot point angle relative to the reference plane in the range of 90±2°.

2. The drill bit according to claim 1 wherein the cutting angle is 10±3°.

3. The drill bit according to claim 1 wherein the length of the base is at least 0.7 mm.

4. The drill bit according to claim 1 wherein each cutting edge includes a primary angle of clearance of 10±3°.

5. The drill bit according to claim 4 wherein each cutting edge has a secondary angle of clearance of 25±5°.

6. The drill bit according to claim 1 wherein the body comprises a hard metal.

7. The drill bit according to claim 1 wherein the body comprises a diamond material.

8. The drill bit according to claim 1 wherein the body forms part of a twist drill.

9. The drill bit according to claim 8 wherein the body includes helical flutes defining chip channels, an outer edge of each flute defining a guide edge having a helix angle greater than zero and less than 30°.

* * * * *